US010900482B2

(12) United States Patent
Wagner et al.

(10) Patent No.: US 10,900,482 B2
(45) Date of Patent: *Jan. 26, 2021

(54) P AND I DIAGRAM INPUT (71) Applicant: KAESER KOMPRESSOREN SE, Coburg (DE)

(72) Inventors: Florian Wagner, Coburg (DE); Andreas Birkenfeld, Karlstadt (DE); Anika Hartwich, Coburg (DE)

(73) Assignee: KAESER KOMPRESSOREN SE, Coburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,892

(22) Filed: Dec. 17, 2018

(65) Prior Publication Data

US 2019/0120224 A1    Apr. 25, 2019

Related U.S. Application Data

(63) Continuation of application No. 14/776,207, filed as application No. PCT/EP2014/055082 on Mar. 14, 2014, now Pat. No. 10,202,974.

(30) Foreign Application Priority Data

Mar. 15, 2013  (EP) .................................... 13159618

(51) Int. Cl.
*F04B 49/06*        (2006.01)
*G05D 16/20*       (2006.01)
(Continued)

(52) U.S. Cl.
CPC ............ *F04B 49/065* (2013.01); *F04B 41/06* (2013.01); *F04B 49/007* (2013.01); *F04B 51/00* (2013.01);
(Continued)

(58) Field of Classification Search
CPC ........ F04B 49/065; F04B 41/06; F04B 51/00; G05B 17/02
See application file for complete search history.

(56) References Cited

U.S. PATENT DOCUMENTS 6,643,555 B1 * 11/2003 Eller .................. G05B 19/0426
                                                               700/17
RE40,817 E     6/2009 Krivoshein et al.
(Continued)

FOREIGN PATENT DOCUMENTS

CN        202789642 U     3/2013
EP          1213633 A1    6/2002
(Continued)

*Primary Examiner* — Vincent H Tran
(74) *Attorney, Agent, or Firm* — Cantor Colburn LLP (57) ABSTRACT

A method for controlling and/or monitoring a compressor system is provided. The compressor system includes one or more compressors and one or more peripheral devices. The compressors and the peripheral devices are arranged or connected in a predetermined configuration. The compressor system is controlled and/or monitored by a control/monitoring unit. After creation of the compressor system, the concretely existing configuration is input in the form of a P&I diagram by an editor and forms the basis for subsequent control, monitoring, diagnosis or evaluation routines.

21 Claims, 7 Drawing Sheets

(51) Int. Cl.
  *F04B 41/06* (2006.01)
  *F04B 49/00* (2006.01)
  *F04B 51/00* (2006.01)
  *F04D 25/16* (2006.01)
  *F04D 27/00* (2006.01)
  *G05B 17/02* (2006.01)

(52) U.S. Cl.
  CPC ........... *F04D 25/16* (2013.01); *F04D 27/001* (2013.01); *G05B 17/02* (2013.01); *G05D 16/2046* (2013.01)

(56) References Cited

U.S. PATENT DOCUMENTS

| | | | |
|---|---|---|---|
| 10,202,974 B2* | 2/2019 | Wagner | G05B 17/02 |
| 2011/0055093 A1* | 3/2011 | Kling | G06F 30/00 |
| | | | 705/317 |
| 2012/0029706 A1* | 2/2012 | Wagner | F04C 28/02 |
| | | | 700/282 |
| 2012/0127971 A1* | 5/2012 | Isaksson | H04W 72/0446 |
| | | | 370/337 |
| 2013/0031483 A1 | 1/2013 | Vure | |
| 2013/0124175 A1* | 5/2013 | McKim | G09B 19/003 |
| | | | 703/6 |
| 2013/0131877 A1* | 5/2013 | Hirose | G06F 1/26 |
| | | | 700/286 |
| 2015/0153725 A1* | 6/2015 | Matheny | G05B 19/4155 |
| | | | 700/117 |

FOREIGN PATENT DOCUMENTS

| | | |
|---|---|---|
| JP | 2006244072 A | 9/2006 |
| WO | 2007030421 A2 | 3/2007 |
| WO | 2009108328 A1 | 9/2009 |

* cited by examiner

```
IF  V1 "open" AND V2 "open":
    T1: K1, K2, K3
    T2: K1, K2, K3
IF  V1 "open" AND V2 "closed":
    T1: K1, K2
    T2: K3
IF  V1 "closed" AND V2 "open":
    T1: K1
    T2: K2, K3
IF  V1 "closed" AND V2 "closed":
    T1: K1
    T2: K3
```

Time of switching of compressor

Fig. 12

P AND I DIAGRAM INPUT

CROSS-REFERENCE TO RELATED APPLICATIONS

This application is a continuation of U.S. patent application Ser. No. 14/776,207 which was filed on Sep. 14, 2015 under 35 U.S.C. 371 as the National Stage of International Patent Application No. PCT/EP2014/055082, filed on Mar. 14, 2014, which claimed priority to European Patent Application Number 13159618.1 filed on Mar. 15, 2013, all of which said applications are incorporated herein by reference in their entirety.

BACKGROUND OF THE PRESENT INVENTION

The present invention relates to compressor system and to a method for controlling and/or monitoring a compression system comprising one or more compressors and one or more peripheral devices, wherein the compressor and peripheral devices are arranged or connected in a predetermined configuration, and the compressor system is controlled and/or monitored by a control/monitoring unit.

Compressor systems constitute a system composed of a multiplicity of compressors and peripheral devices of various types which are coupled to one another via an air pipeline network, and via a water pipeline network when heat recovery systems are used. In general, compressor systems are configured individually for the local conditions. There is no generally valid structure for compressor systems. The behavior of a concrete compressor system may therefore only be analyzed and evaluated in a restrictive fashion without knowledge of the structure of the compressor system.

In order to actuate and diagnose the compressors and peripheral devices in a compressor system, so-called superordinate station controllers are used. Such station controllers are comparable, in terms of their function, with control systems in process engineering. The essential difference from control systems is that control systems normally operate with a control and analysis method which has been developed specifically for the process to be controlled. In the specific development, knowledge about the structure of the process to be controlled and the operational relationships between the individual components of the process is coded. However, in the case of station controllers, control and analysis methods which have been developed specifically for the compressor system to be controlled and monitored are the exception. In the normal case, a standard control and analysis method is used which is adapted to the local conditions merely by parameterization.

An objective of the present invention is, in contrast with the prior art, to specify a method for controlling and/or monitoring a compressor system which takes into account the local conditions of a compressor system more precisely. The present invention also relates to a compressor system which takes into account the local conditions of a compressor system more precisely.

BRIEF SUMMARY OF THE PRESENT INVENTION

Embodiments of the present invention relate to a compressor system, a method for controlling and/or monitoring a compressor system, and a control and monitoring unit for controlling and/or monitoring a compressor system.

A core concept of the present invention is that, in particular after the production of the compressor system, the concretely provided configuration or the concretely provided operational relationship between the one or more compressors and the one or more peripheral devices is input in the form of a Process and Instrumentation ("P&I") diagram by an editor and is used as the basis for, or made available for, subsequent control, monitoring, diagnostic or evaluation routines.

A control, monitoring, diagnostic or evaluation routine is to be understood as meaning quite generally different control functions, monitoring functions, diagnostic functions or evaluation functions.

Insofar as it is stated that the compressors and peripheral devices are arranged or connected in a predetermined configuration, this is to be understood as also including a plurality of changing states, for example an alternative configuration which may be achieved by switching over a valve or a switch. A predetermined configuration is, to this extent, the quantity of all of the conceivable configurations which the compressor system may assume in different operating states.

The editor and/or the storage section may also be a component of the control/monitoring system or integrated therein.

The configuration in the form of a P&I diagram is also to be understood as being included and, to this extent, acquires the operational relationships between the compressors and peripheral devices from different viewpoints and in different domains, wherein the acquisition of the operational relationships in one domain or from one view point is self-evidently sufficient for the implementation of the present invention.

Possible domains or possible viewpoints include, by way of example but not exclusively, the operational relationships in terms of compressed air technology which may be represented in a P&I diagram in the narrower sense, in particular a compressed air P&I diagram, the heat-recovery-related operational relationships which may be represented in a P&I diagram in the narrower sense, in particular in a heat recovery P&I diagram, the cooling-water-circuit-related operational relationships which may be represented in a P&I diagram in the narrower sense, in particular in a cooling water circuit P&I diagram, and the power-supply-related operational relationships which may be represented in an electrical circuit diagram. Furthermore, a P&I diagram in the sense of the present invention may be limited in an abstract form to the underlying operational relationships from one point of view/from one domain, and to this extent does not need to include all the details of a possibly otherwise customary P&I diagram.

Instead of the term P&I diagram, it is also possible to understand in this regard a graphic representation of the operational relationships from a specific point of view and/or in a specific domain, such as, for example, a graphic representation of the operational relationships in terms of compressed air technology or a graphic representation of the heat-recovery-related operational relationships. It involves, in this regard, a flow chart which represents the flow of energy and/or operating mechanisms/relationships and/or compressed air between the individual compressors and the individual peripheral devices.

Although the operational relationships are illustrated graphically, it is not absolutely necessary to process or input them in a graphic form by the editor, even though this constitutes a possible embodiment of the present invention. Instead, it is also possible to input the operational relationships entirely or partially in text by the editor. Finally, other forms of input are also conceivable, for example a voice input or else an input by automatic image recognition. The editor may, in this respect, also be considered as an input interface.

While it is in theory preferred to input the concretely provided configuration in the form of a P&I diagram only after the production of a compressor system, it is, however, also conceivable to perform this inputting even before the production or during the production of the compressor system, insofar as the concretely provided configuration or the concretely provided operational relationship has already been defined.

A precondition for the production of the output models is knowledge of the operational relationships in the compressor system. It is not absolutely necessary for the compressor system to exist. For example, one or more output models or one P&I diagram or a plurality of domain-specific P&I diagrams may be produced already during the planning of a compressor system. It is also not necessary for the output models to be produced immediately or the P&I diagrams to be input immediately when the structure of the compressor system is fixed. The output models and the P&I diagrams must be defined or produced at the latest when the P&I diagrams or the output models are to be used.

It is self-evident that the method according to the present invention may also be carried out repeatedly, for example when something has changed in the concretely provided configuration, that is to say in the real structure of the compressor system or when an error has occurred in the previous inputting of the P&I diagram.

The control/monitoring unit may be embodied as a unit which performs both controlling and monitoring functions or else only controlling or only monitoring functions.

One expedient development of the method according to the present invention provides that after the inputting of the concretely provided configuration, the latter is stored at the prompting of the control/monitoring unit.

In one possible optional embodiment, the inputting of the P&I diagram comprises exclusively the configuration or connection of the compressors and peripheral devices which are already known to the control/monitoring unit. In this context, the existence of a specific compressor or of a specific peripheral device may, as such, already be known to the control/monitoring unit or in addition to the mere existence of specific compressors or specific peripheral devices, and the concrete specification of the compressors and peripheral devices which are present may already be known to the control/monitoring unit. In one alternative, likewise optional, embodiment of the method, the inputting of the P&I diagram also comprises, in addition to the inputting of the configuration or connection of the compressors and peripheral devices, the concrete specification of the compressors and peripheral devices which are present.

In one particularly preferred embodiment of the method, the inputting of the P&I diagram is performed on the user side. Since compressors and/or peripheral devices from different manufacturers are often combined with one another on the user side in order to produce a concrete compressor system, the acquisition of the operational relationships on the user side is a preferred possible embodiment.

In one possible embodiment of the method according to the present invention, there may be provision that when the P&I diagram is input by the editor, the compressors and peripheral devices are predefined or may be selected as corresponding graphic symbols. Likewise, in one possible embodiment, there may be provision that when the P&I diagram is input by the editor, the connections of the compressors and of the peripheral devices are predefined or may be selected as corresponding graphic symbols.

Furthermore, there may be provision that when the P&I diagram is input by the editor, various possible specifications of the compressors and/or of the peripheral devices are predefined or may be selected.

In one possible embodiment, there may be provision that the presence of one or more compressors and one or more peripheral devices and/or the specification of some or of all of the compressors and/or of some or of all the peripheral devices is transferred from the outside, is input in particular by an upload of corresponding information, for example as an upload of a file which is made available by the manufacturer of the system.

One possible embodiment of the present invention also provides that some or all of the compressors and/or peripheral devices sign on automatically at the control/monitoring unit and also preferably automatically transfer their specification. This signing on or transfer may occur in a line-bound fashion, in particular wire-bound or glass-fiber-bound or by radio waves.

As an alternative to inputting a P&I diagram into the control/monitoring unit by an editor, knowledge about the operational relationships may also be input into the control/monitoring unit in other ways, such as:

importing a description/a model into the control/monitoring unit;

automatic detection and, if appropriate, acquisition of the specification of some or all of the compressors or of some or all of the peripheral devices of a compressor system. It is conceivable, for example, that the control/monitoring unit integrates the compressors and/or peripheral devices according to their properties by corresponding communication. Alternatively, the compressors and/or peripheral devices sign on at the control/monitoring unit, preferably by giving their specification; and Finally, automatic detection of parts of the compressor system, for example by operator parameter analysis and/or by imaging detection systems is also possible. This may be directed to the following partial detection:

detection of the connection of compressors and/or peripheral devices, detection of compressors and/or peripheral devices, and/or tuning of the model parameters.

In one possible embodiment of the method according to the present invention, the selection of graphic symbols for representing compressors or peripheral devices and/or the selection of concrete specifications and/or the selection of specific connections occur by marking in a proposal list, wherein the selected object or the selected information may subsequently be transmitted into the P&I diagram which is to be produced in the editor. However, this is a very concrete, possible embodiment. Numerous other modifications are possible, in particular in relation to an input which is partially or exclusively textual, an input by voice recognition or an input by image recognition.

As already mentioned, there may be provision according to the present invention that an operational relationship or a configuration is input in the form of a P&I diagram for just one domain/one viewpoint. In one possible embodiment, respective P&I diagrams or respective configurations or operational relationships are input for two or more different domains/viewpoints, for example a:

compressed air P&I diagram; and/or a heat recovery P&I diagram; and/or a cooling-circuit-related P&I diagram; and/or a power-supply-related operational relationship, in particular an electrical circuit diagram.

Quite generally it is to be noted that the control/monitoring unit may be implemented in one or more servers, which have an operative connection to one another, or in a virtual computer.

Furthermore there may be provision that one or more output models $M_1$, $M_2$, ... of the compressor system are produced based on the P&I diagram, and that on the basis of these output models $M_1$, $M_2$, ... one or more derived models $\tilde{M}_a$, $\tilde{M}_b$, ..., are produced which take into account operational relationships between the individual compressors and peripheral devices and, if appropriate, also dynamic processors, and that the one or more derived models $\tilde{M}_a$, $\tilde{M}_b$, ... are used as the basis for the subsequent control, monitoring, diagnostic or evaluation routines.

In the sense of this preferred embodiment, a derived model may be obtained, for example, from precisely one output model. It is, however, also possible for one derived model to be obtained from two or more output models or for two or more derived models to be produced which are based on a single output model. Finally, it is possible for two or more derived models to be obtained from two or more output models.

The derived model $\tilde{M}_a$, $\tilde{M}_b$, ... may be a final model which is used directly in adjacent control, monitoring, diagnostic or evaluation routines and is used as the basis for these control, monitoring, diagnostic or evaluation routines. However, it may be also be an intermediate model from which the final model is developed in one or more steps and is ultimately used in subsequent control, monitoring, diagnostic or evaluation routines, or is used as the basis for these control, monitoring, diagnostic or evaluation routines.

In one possible embodiment, the derived model $\tilde{M}_a$, $\tilde{M}_b$, ... may be an aspect-specific model AM which is produced from the one or more output models $M_1$, $M_2$, ... or from one or more intermediate models $M_1'$, $M_2'$, $AAM_1$, $AAM_2$ by using an aspect-specific analysis algorithm. An aspect-specific model is intended to be a model which clarifies the compressor system with respect to a concrete question. Conceivable aspects which may give rise to an aspect-specific model are, by way of example but not exhaustively: moisture, pressure loss, quality of compressed air, pressure quality, pressure behavior, energy efficiency, energy take-up, energy balance, temperatures, volume flows/mass flows, costs, reserve margin and/or reliability.

In one possible preferred embodiment of the method, the information about the aspect-specific behavior of a compressor or of a peripheral device is contained in one or more component models KM to be taken into account in the aspect output model AAM and/or in the analysis algorithm itself.

In the aspect-specific analysis algorithms, it is encoded how the output models are to be interpreted with respect to an aspect (or a plurality of aspects). Likewise, the aspect-specific analysis algorithms contain knowledge about the dynamic behavior of compressors and/or peripheral devices with respect to the aspect under consideration (the aspects under consideration). Optionally, the aspect-specific analysis algorithm uses aspect-specific component models in order to produce the derived models.

In one preferred embodiment of the method, there is provision that an assigned analysis algorithm is provided for each aspect-specific model AM which is to be produced. An analysis algorithm is normally developed specifically for a question which is to be answered with the aspect-specific model. When there are related questions, it may be the case in this context that the same analysis algorithm, or only a slightly modified one, comes to be used for the application. However, as already mentioned, a concrete analysis algorithm is assigned to each aspect-specific question or each aspect-specific model.

Other derived models, in particular intermediate models, may also be developed from analysis algorithms which are the same or similar to the derived aspect-specific analysis algorithms in individual cases.

In one preferred embodiment, there may be provision that the derived model $\tilde{M}_a$, $\tilde{M}_b$, ... regardless of whether it is a final model or an intermediate model—is stored in the control/monitoring unit or stored externally at the prompting of the control/monitoring unit.

In one possible development there may be provision that the derived model or models $\tilde{M}_a$, $\tilde{M}_b$, ... are derived and/or stored and/or applied in an external system. In this case, in this respect one or more activities are carried out in conjunction with the derived models $\tilde{M}_a$, $\tilde{M}_b$, ... externally and, if appropriate, not under the direct or indirect control of the control/monitoring unit.

In concrete terms, the following sequence may be conceivable:

1. Operating parameters are acquired in the compressor system and stored in the control/monitoring unit.
2. These operating parameters are evaluated by applying corresponding models on an external server. The server is not a component of the control/monitoring unit and not a component of the compressor system either.
3. The method step specified under 2 is also understood to be an inventive method for controlling and/or monitoring a compressor system, even though it is not itself carried out within the compressor system and even though the control/monitoring unit is not involved therein.
4. The result of the abovementioned monitoring/evaluation method may be, for example:
    a) the calculation of a subsequent maintenance deadline; and/or
    b) optimization of closed-loop control or open-loop control parameters (for example the calculation of a reduced required pressure).
5. With the results specified under 4, it is then possible:
    a) for (automatic) maintenance planning to be carried out by a compressor system manufacturer or compressor system operator in order to increase the availability of the compressor system through timely maintenance; and/or
    b) for the energy efficiency of the compressed air generation to be improved by the reparameterization (manually or automatically) of the compressor system control to the calculated optimum required pressure.

In one preferred embodiment, there may be provision that the derived model or models $\tilde{M}_a$, $\tilde{M}_b$, ... are checked continuously or cyclically or in an event-based fashion and, if appropriate, adapted automatically. For example, during operation of the compressor system an improved data basis may be obtained, with the result that the improved data basis may be the reason for adapting the derived model or models.

In a further optional embodiment, there may be provision that when the output model $M_1$, $M_2$, ... changes or when one or more component models KM change, for example since structural changes are made to the compressor system, the derived model or models are also adapted.

In one possible embodiment, different domain-specific output models may be taken into account for the production of one or more derived models, whether intermediate models or end models. In particular compressor-air-specific output models, power-supply-specific output models, output models which are related to the cooling water circuit or output models which are related to the recovery of heat may be considered domain-specific output models, and in this respect two or more models of different domains may be combined or taken into account. It is also possible to acquire and model interactions between the different domains.

In one possible embodiment, an intermediate model is considered as a derived model, the intermediate model also taking into account, in contrast with the output model or models, a dynamic behavior or different operating states of the compressor system.

An alternative or additional intermediate model which, if necessary, may be positioned hierarchically before or after the intermediate model discussed above, consists in the intermediate model being adapted and, if appropriate, simplified in an aspect-specific fashion compared to one or more output models or compared to one or more intermediate models. If, for example, the question as to which compressor is respectively connected to a downstream drier is investigated in a compressor system, filters which are arranged intermediately do not play any role and may be disregarded in an intermediate model from the viewpoint of this question with the result that a simplified intermediate model may be defined.

If this path is adopted (i.e., an aspect-specific output model is defined), it is preferably possible to produce an aspect-specific model by using an aspect-specific analysis algorithm, and in the selected example, it is therefore possible to answer the question as to which drier may be supplied by which compressor on the basis of the aspect-specific output model AAM in which, for example, the filters have been disregarded as peripheral devices which are not to be taken into account in the concrete question.

In one possibly alternative or additional embodiment of the method according to the present invention, a method for monitoring a compressor system comprising one or more compressors and one or more peripheral devices is proposed, wherein the compressors and peripheral devices are arranged or connected in a predetermined configuration, wherein the compressor system is controlled and/or monitored by a control/monitoring unit, wherein the method produces a prediction for the next maintenance deadline of the compressor system or of individual compressors or individual peripheral devices, and wherein in particular after the production of the compressor system, the concretely provided configuration is input in the form of a P&I diagram by an editor (23), and this inputting forms the basis for one or more output models;

on the basis of these output models ($M_1$, $M_2$, ... ), one or more derived models ($\tilde{M}_a$, $\tilde{M}_b$, ... ) are produced which take into account operational relationships between the individual compressors (11, 12, 13) and the peripheral devices (14 to 21) and, if appropriate, also dynamic processes; and a prediction for the next maintenance deadline is produced taking into account standardized operational data of the compressor system using the derived model or models ($\tilde{M}_a$, $\tilde{M}_b$, ... ).

In a possibly alternative or additional embodiment of the method according to the present invention, a method for monitoring a compressor system comprising one or more compressors and one or more peripheral devices is furthermore proposed, wherein the compressors and peripheral devices are arranged or connected in a predetermined configuration, wherein the compressor system is controlled and/or monitored by a control/monitoring unit, wherein the method is configured as a diagnostic method for diagnosing the compressor system or individual compressors or individual peripheral devices, and wherein in particular after the production of the compressor system, the concretely provided configuration is input in the form of a P&I diagram by an editor (23), and this inputting forms the basis for one or more output models;

on the basis of these output models (M1, M2, ... ), one or more derived models ($\tilde{M}_a$, $\tilde{M}_b$, ... ) are produced which take into account operational relationships between the individual compressors (11, 12, 13) and the peripheral devices (14 to 21) and, if appropriate, also dynamic processes; and a fault diagnosis is carried out taking into account standardized operational data of the compressor system using the derived model or models ($\tilde{M}_a$, $\tilde{M}_b$, ... ).

The compressor system according to the present invention provides that the editor is designed and intended to input the concretely provided configuration in the form of a P&I diagram, and the editor is operatively connected to the control/monitoring unit in such a way that the input P&I diagram is transmitted to the control/monitoring unit in order to use it as the basis for subsequent control, monitoring, diagnostic or evaluation routines.

Firstly, the explanations already given in relation to the method according to the present invention apply for all of the concepts. The compressor system may also be configured and intended quite generally to execute and implement the method described above.

In one embodiment, there may be provision that the control/monitoring unit ensures that the input P&I diagram or diagrams are stored. Furthermore, in one possible embodiment, there may be provision that specifications of the compressors or peripheral devices which are used in the compressor system are stored in the control/monitoring unit in such a way that the inputting of the P&I diagram comprises exclusively the configuration and/or connection of the compressors and peripheral devices. Alternatively, it is, however, also possible to provide, as already described with reference to the method, that when the P&I diagram is input not only the configuration or connection of the compressors and peripheral devices is defined, but also it is also firstly defined whether one or more compressors and one or more peripheral devices are at all present and/or preferably specifications of at least a portion of the compressors or peripheral devices are also input.

In one possible embodiment, there may be provision that the control/monitoring unit makes available in a storage section lists of specifications of possible compressors or of peripheral devices and/or graphic symbols for representing compressors which are used or peripheral devices which are used and/or graphic symbols for representing possible connections for selection by producing a P&I diagram in the editor. The selection of the corresponding information or graphic symbols may occur by various possible input possibilities such as, for example, under cursor control, mouse control, text control, voice control etc. In the same way, the P&I diagram may be produced in the editor on the basis of the selected symbols and/or information.

In one preferred embodiment, the control/monitoring unit may be implemented in one or more servers which have an operative connection to one another, or in a virtual computer.

Furthermore, the compressor system may also be developed in that the compressors and peripheral devices are arranged or connected in a predetermined configuration, wherein the compressor system is controlled and/or monitored by a control/monitoring unit which is defined in that the control/monitoring unit is embodied and configured in such a way that in the case of control, monitoring diagnostic or evaluation routines, it accesses one or more derived models ($\tilde{M}_a$, $\tilde{M}_b$, . . . ) of the compressor system, which model or models is/are produced on the basis of one or more output models $M_1$, $M_2$, . . . of the compressor system, but also takes into account operational relationships between the individual compressors and the peripheral devices as well as, if appropriate, also dynamic processes.

In one possible embodiment of the compressor system according to the present invention, there may be provision that the control/monitoring unit ensures that the derived model or models $\tilde{M}_a$, $\tilde{M}_b$, . . . are stored.

Furthermore, in one possible embodiment, there may also be provision that the control/monitoring unit also comprises an editor, and the editor is designed and intended to input the concretely provided configuration of the compressor system in the form of a P&I diagram, and the editor also has an operative connection to the control/monitoring unit in such a way that the input P&I diagram is transmitted to the control/monitoring unit and serves there as an output basis for producing one or more output models $M_1$, $M_2$, . . . .

Furthermore, the present invention relates to a control and monitoring unit for controlling and/or monitoring a compressor system comprising one or more compressors and one or more peripheral devices, wherein the compressors and peripheral devices are arranged or connected to a predetermined configuration, and the control/monitoring unit brings about the control and/or monitoring of the compressor system and interacts with an editor, wherein the editor is designed and intended to input the concretely provided configuration in the form of a P&I diagram, and the editor is operatively connected to the control/monitoring unit in such a way that the P&I diagram which is input is transmitted to the control/monitoring unit in order to use it as a basis for following control, monitoring, diagnostic or evaluation routines.

The explanations already given in relation to the method according to the present invention and the compressor system according to the present invention also apply here for the concepts used. The control/monitoring unit is generally designed to carry out the method according to the present invention, with the result that all the described possible optional embodiments may also be implemented in the control and monitoring unit.

BRIEF DESCRIPTION OF THE SEVERAL VIEWS OF THE DRAWINGS

The foregoing summary, as well as the following detailed description of the present invention, will be better understood when read in conjunction with the appended drawings. For the purpose of illustrating the present invention, there are shown in the drawings embodiments which are presently preferred. It should be understood, however, that the present invention is not limited to the precise arrangements and instrumentalities shown.

In the drawings.

DETAILED DESCRIPTION OF THE PRESENT INVENTION

Figure 1:
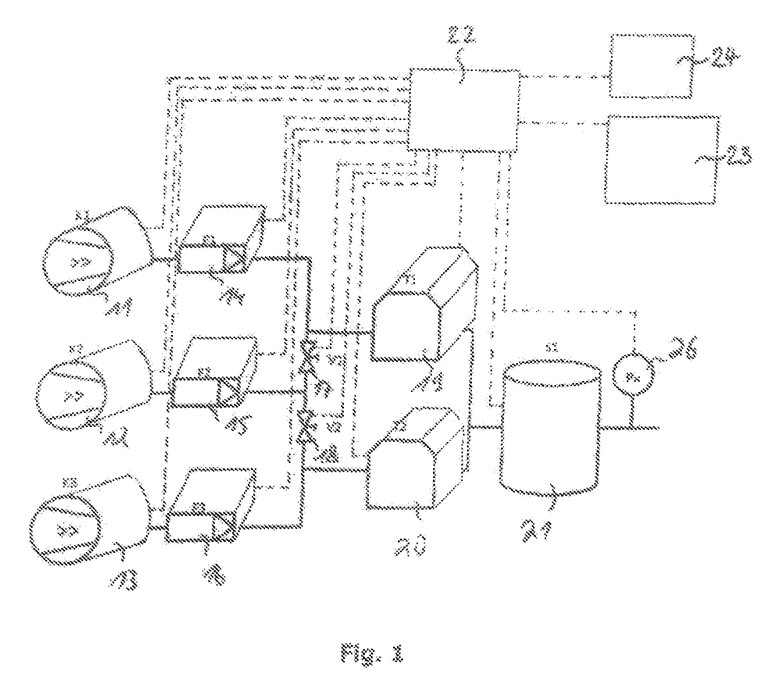
FIG. 1 shows a purely exemplary configuration of a real compressor system which interacts with a control/monitoring unit according to an embodiment of the present invention.

FIG. 1 shows an exemplary design of a compressor system according to the present invention. The exemplary compressor system comprises three compressors 11, 12, 13 which are arranged serially with respect to one another. Each compressor 11, 12, 13 may be unambiguously assigned a filter 14, 15, 16, each of which is arranged downstream of the assigned compressor 11, 12, 13. Two driers 19, 20 are arranged downstream of the filters 14, 15, 16. The compressed air downstream of the first filter 14 is intended always to flow via the first drier 19. The compressed air downstream of the second filter 15 may be directed via two valves 17, 18 either via the first drier 19 or via the second drier 20. The two valves 17, 18 are connected or actuated in such a way that they are never opened simultaneously. That is, when the first valve 17 is opened, the second valve 18 remains closed, and when the second valve 18 is opened, the first valve 17 remains closed.

A compressed air accumulator 21 is arranged downstream of the two driers 19, 20. Arranged on the output side of the compressed air accumulator 21 is also a pressure sensor 26 for acquiring the operating pressure there.

In order to control and/or monitor the compressor system, a control/monitoring unit 22 is provided which has an operative connection to the compressors 11, 12, 13 and the filters 14, 15, 16, the valves 17, 18, the driers 19, 20, the compressed air accumulator 21 and the pressure sensor 26. The filters 14, 15, 16, the valves 17, 18, the driers 19, 20, the compressed air accumulator 21 and the pressure sensor 26 form peripheral devices of the compressor system. The control/monitoring unit 22 also has an operative connection to a memory section 24 and to an editor 23. The control/monitoring unit 22 may perform control functions, monitoring functions or control and monitoring functions. Monitoring is to be understood as meaning any form of evaluation, that is to say not only monitoring for malfunctions, unusual operating states, alarm situations etc., but also diagnostics, in particular in the case of an already present fault message, an evaluation with respect to optimization or an evaluation for predicting the next maintenance deadline (predictive maintenance).

In order to perform one or more of these functions, models of the operational relationships of the compressors 11, 12, 13 and of the peripheral devices 14 to 21 are to be acquired and made accessible to the control/monitoring unit 22. For this purpose, preferably, on the one hand, the concretely provided configuration in the form of a P&I diagram is input by an editor 23 which has an operative connection to the control/monitoring unit 22. On the other hand, one or more output models $M_1$, $M_2$ ... are produced by the control/monitoring unit 22 or externally from this input configuration which encodes the operational relationship between the compressors 11, 12, 13 and the peripheral device 14 to 21, and one or more derived models $\tilde{M}_a$, $\tilde{M}_b$, ..., which take into account operational relationships between the individual compressors 11, 12, 13 and peripheral devices 14 to 21, are developed based on these output models $M_1$, $M_2$, ....

Figure 2:
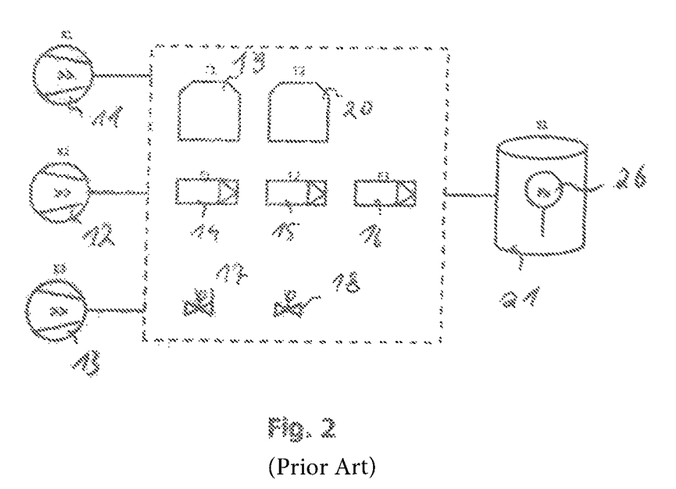
FIG. 2 shows a modeling of the compressor system according to FIG. 1, according to the prior art.

In a delimitation with respect to the above, in the prior art, as illustrated with respect to FIG. 2, the operational relationship between the individual compressors 11, 12, 13 and the peripheral devices 14 to 21 (in the present example, the filters 14, 15, 16, the driers 19, 20 and the valves 17, 18 and the compressed air accumulator 21) are not concretely taken into account. In the methods for controlling and/or monitoring a compressor system according to the prior art, the peripheral devices of the compressed air conditioning system and the connection of these peripheral devices are, from a structural viewpoint, nothing other than a black box, which in this respect does not appropriately map the compressor system.

Figure 3:
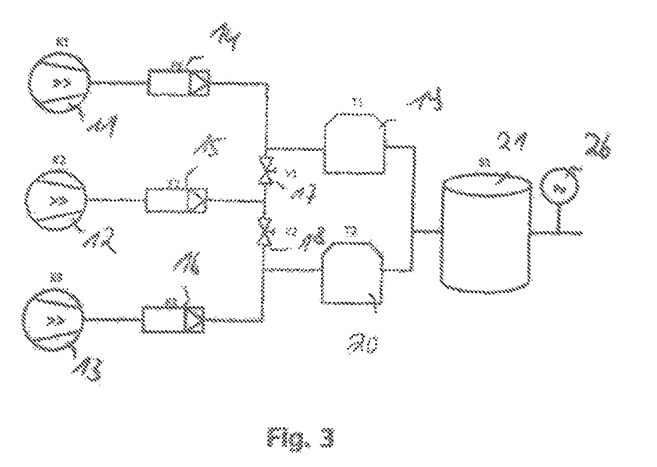
FIG. 3 shows an output model which represents the compressor system in its concretely provided configuration in the form of a P&I diagram.

The present invention therefore provides that, in order to produce a model of the compressor system, in particular after the production of the compressor system, the concretely provided configuration in the form of a P&I diagram is input by the already mentioned editor 23. A P&I diagram which is representative of the compressor system according to FIG. 1 is represented in FIG. 3. It is to be taken into account that many variants are conceivable for the inputting of this P&I diagram. The inputting of the P&I diagram is intended to comprise at least the step of defining the operational relationships between the compressors 11, 12, 13 and the peripheral devices 14 to 21, but may preferably also comprise a preliminary step, specifically the acquisition of the presence of the compressors 11, 12, 13 and the individual peripheral devices 14 to 21, preferably also a further third step, specifically the inputting of the specifications of the compressors 11, 12, 13 and of the peripheral devices 14 to 21. It is conceivable that the acquisition of the presence, of the operational relationships and of the specifications occurs in different ways, for example the operational relationships are input graphically by the editor 23, and the other information is transferred in other ways to the control/monitoring unit 22, for example by an upload of a file which is, for example, made available by the system manufacturer. A wide variety of variants are also conceivable for the inputting via the editor 23, as has already been explained in the introductory part of the description.

Figure 4:
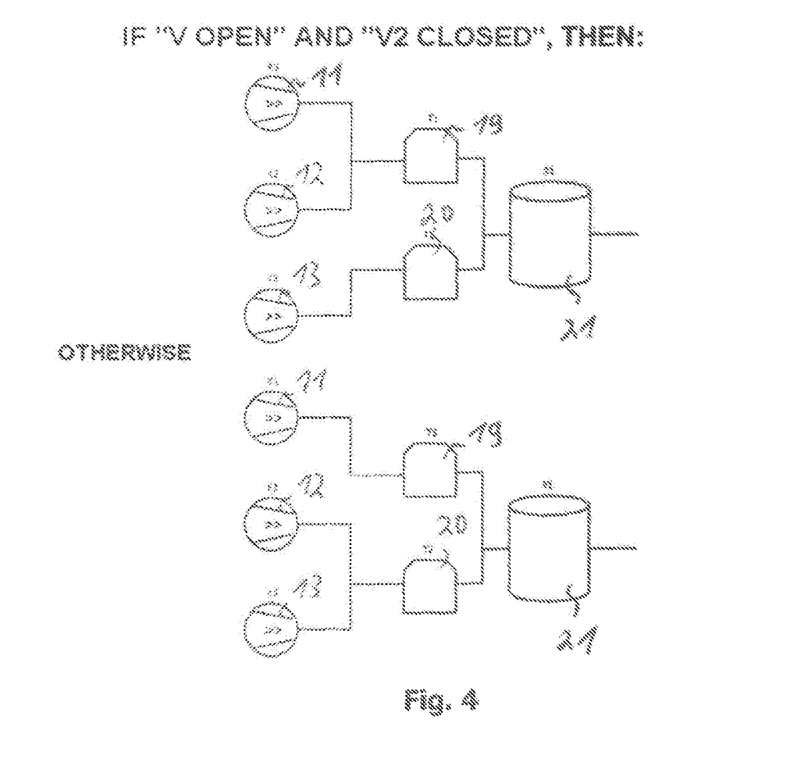
FIG. 4 shows a model M' which is derived from the P&I diagram according to FIG. 3, as an output model and takes into account different operating states.

In FIG. 4, a derived model M' is illustrated which already models and takes into account different possible operating states of the output model according to FIG. 3 which is given as a P&I diagram. While the model according to FIG. 3 does not yet contain information as to which drier 19, 20 is supplied by which compressor 11, 12, 13, the model M' illustrated in FIG. 4 takes into account the different conditions in that it relates to the differentiation between cases: "if the first valve 17 and second valve 18 are closed, then . . . otherwise . . . " V1 denotes here the first valve 17, and V2 the second valve 18. T1 denotes the first drier 19 and T2 denotes the second drier 20, K1 denotes the first compressor 11, K2 denotes the second compressor 12, and K13 denotes the third compressor 13.

Figure 5:
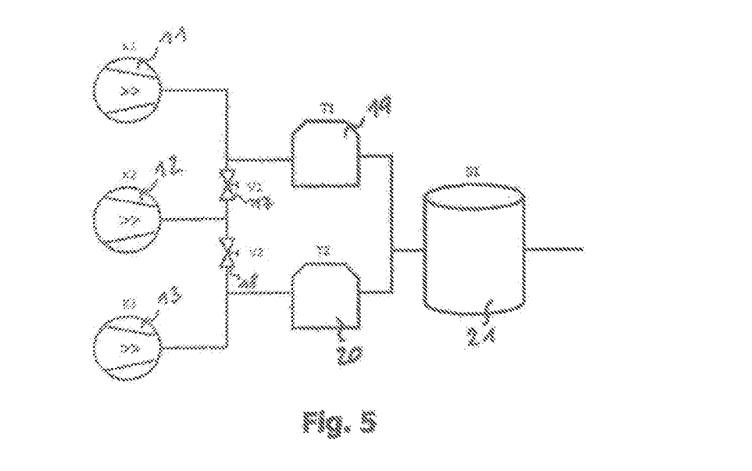
FIG. 5 shows a model which is derived from the P&I diagram according to FIG. 3, as an output model and may be considered to be a simplified aspect-specific output model AAM.

FIG. 5 shows a model which is derived from the P&I diagram according to FIG. 3 as an output model and which may be considered as a simplified aspect-specific output model AAM. If, for example, the aspect as to which drier 19, 20 may be supplied by which compressor 11, 12, 13 is investigated within the domain of compressed air, in order on this basis to develop an aspect-specific model AM which clarifies this question, access is to made to an assigned analysis algorithm and, if appropriate, to component models. The assigned analysis algorithm may be stored at a corresponding location, in particular may be stored in the access region of the control and monitoring unit 22. Aspect-specific component models may be integrated, for example, in a database.

In the present case, it is known to the analysis algorithm that for the question, as to which drier 19, 20 is supplied by which compressor 11, 12, 13, the filters 14, 15, 16 which are still present in the output model according to FIG. 3 may continue to be disregarded. In this respect, it becomes apparent for the question of the aspect-specific output model AAM which is illustrated in FIG. 5 and which is simplified with respect to the output model according to FIG. 3, that the filters 14, 15, 16 are not considered.

Figure 6:
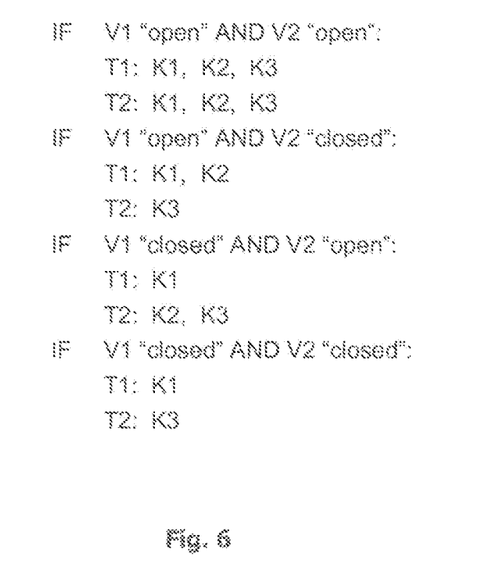
FIG. 6 shows an aspect-specific model AM which has been developed from the aspect-specific output model AAM according to FIG. 5.

In FIG. 6, the aspect-specific model AM is illustrated which is obtained from the aspect-specific output model according to FIG. 5 for the question as to which of the driers 19, 20 is supplied by which compressor 11, 12, 13. In this respect, for the aspect-specific model according to FIG. 6 the aspect-specific output model AAM was used, which may be considered as an intermediate model and is based on the output model M according to FIG. 3.

Figure 7:
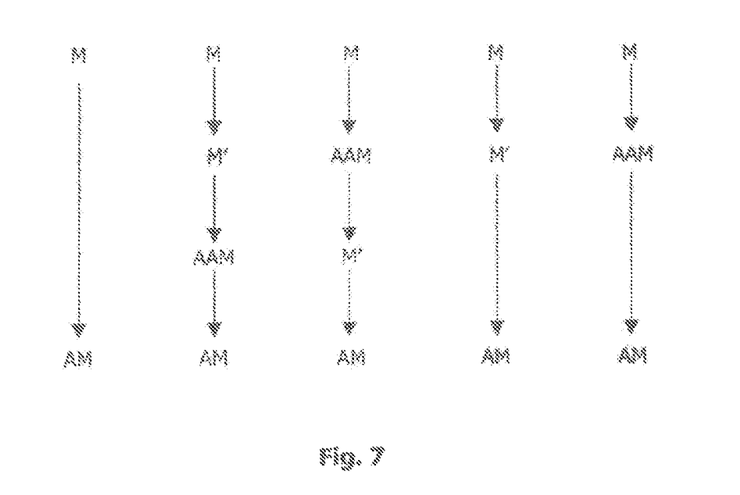
FIG. 7 shows an overview of the possible paths for the development of an aspect-specific model or an aspect-specific final model from an output model.

FIG. 7 illustrates various paths relating to the development of an aspect-specific model AM (or an aspect-specific final model) from an output model M. In this respect it is conceivable to develop one or more aspect-specific models AM directly from one or more output models M. However, it is also conceivable to develop one or more aspect-specific models AM from one or more output models M by intermediate models. Possible intermediate models are either models M' or models AAM, wherein the models M' define in a generalizing fashion for a domain/viewpoint one (or, if appropriate, more) models which define, for example, different operating states of one or more output models. Aspect-specific output models AAM form the basis for arriving at an aspect-specific model AM with the aid of an analysis algorithm and/or by taking into account component models. In this respect, it is conceivable to arrive at the aspect-specific model AM via the path M, M', AAM. However, it is alternatively also possible to arrive at the output model AM from the output model M via AAM and subsequently M'. Finally, it is also possible to arrive at the aspect-specific model AM from the output model M via M'. The example in FIG. 6 has shown that it is also possible to arrive at the aspect-specific model AM from the output model M via AAM. All of the models M', AAM, AM are derived models $\tilde{M}$ which are developed from an output model M. However, the aspect-specific model AM may be considered as a final model which is suitable for answering concrete questions and, in this respect, may be taken into account in following control, monitoring, diagnostic or evaluation routines.

Figure 8:
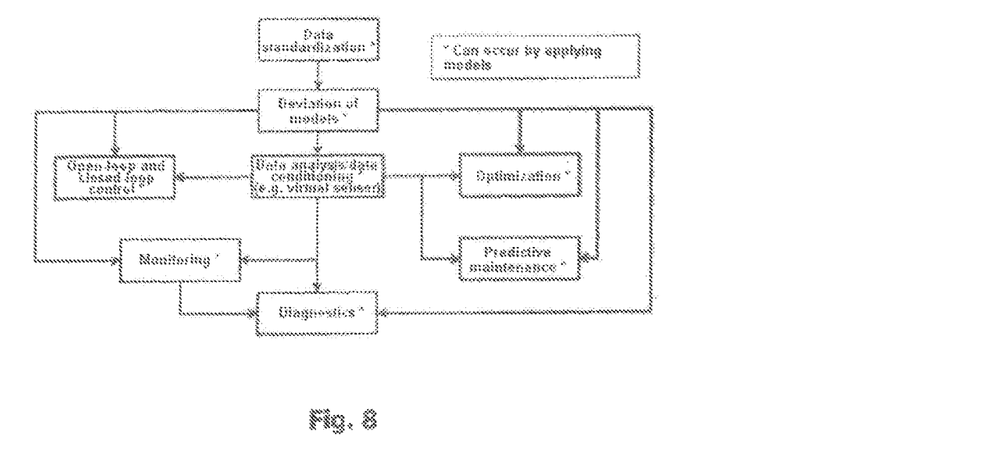
FIG. 8 shows a schematic overview of the individual method steps and the advantages which may be achieved therewith when, on the one hand, the operational relationships between the compressors and peripheral devices of a compressor system in the form of a P&I diagram are taken into account as a basis for one or more output models and, on the other hand, derived models are developed from these output models.

FIG. 8 illustrates a schematic overview of the individual method steps and the advantages which may be achieved on the basis thereof if, on the one hand, the operational relationships between the compressors and peripheral devices of a compressor system in the form of a P&I diagram are taken into account as a basis for one or more output models and, on the other hand, derived models are developed from these output models.

In this respect, FIG. 8 illustrates the relationships between the individual applications of models. The causal relationships which are illustrated in the figure are to be considered both cumulatively and alternatively. The basis for the processing of data is the standardization of the data in the sense that a well-defined meaning is assigned to each individual data item.

Aspect-specific models AM, which may be used for numerous further applications, may, in turn, be derived on the basis of standardized data and the domain-specific output models $M_1$, $M_2$, . . . . Concretely conceivable applications are, for example, open-loop and closed-loop control, optimization of the peripheral conditions under which a concrete compressor system is operated, data analysis, monitoring, diagnostics, prediction of a maintenance deadline (predictive maintenance). With respect to the application, open-loop and closed-loop control may be maintained in that the operation of a compressor system may be improved by using models to determine and implement actuation actions for the compressors and/or peripheral devices under given peripheral conditions (for example required pressure to be complied with) of the compressor system. This involves an optimization which is applied in real time (online application).

Below, examples of the open-loop or closed-loop control of a compressor system will be given showing how the operational procedure of a compressor system may be improved in an aspect-related manner using models and, if appropriate, derived models:

a) Aspect of energy efficiency:
for example, by taking into account the operational relationships of the compressor system, that is to say of the corresponding P&I diagram and, if appropriate, taking into account further derived models, it is possible to ensure that driers of a compressor system are only operated when there is a requirement to dry compressed air. In time periods in which there is no requirement to dry compressed air, driers are not operated and therefore energy for the coverage of "thermal leakages" is saved.

b) Aspect of quality of compressed air:
given knowledge of the operational relationships between the compressors and peripheral devices of a compressor system, the reaction to the failure of a drier may be regulated as follows: if a drier fails, the compressors which are assigned to the drier continue to be operated only if the delivery quantity of the other compressors is not sufficient to cover the compressed air requirement. Insofar as the compressed air piping allows, the compressed air of the compressor which is assigned to the failed drier is distributed to other driers.

Aspect-specific models may be generated as an example of the data analysis using models in the sense of the present invention. Basically, for most conceivable applications, quantitative or qualitative statements may be taken into consideration not only for the data analysis but also for the monitoring, diagnosis, etc. For the aspect of reliability of the compressor system, it is possible, for example, to make a quantitative statement in the sense of a mean-time-to-failure quantification, for example 10,000 hours. A statement which clarifies the reliability of the compressor system can, however, also be made qualitatively, for example as follows: the reliability of the compressor system is evaluated as "high", "medium", "low".

Figure 9:
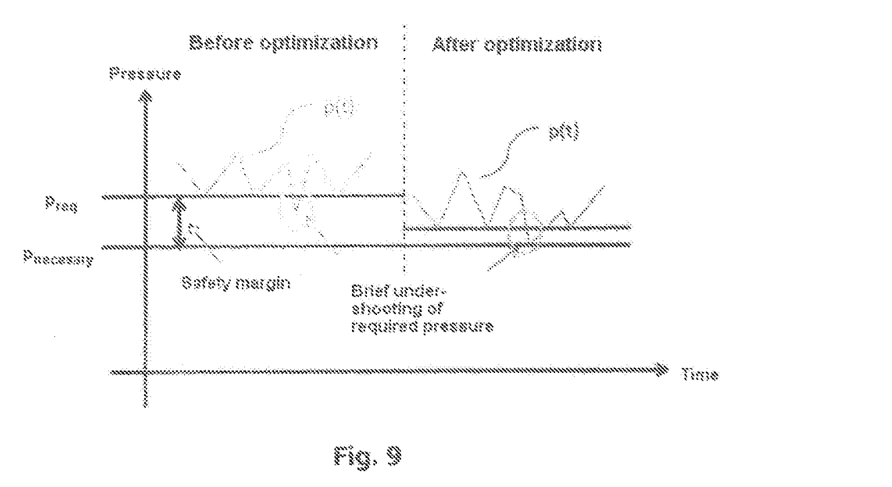
FIG. 9 shows an example of an optimization routine in which the required pressure $p_{req}$ of a compressor system is optimized using models.

An example of optimization may be the determination of the parameter of the required pressure. This optimization may occur both as an offline optimization, as well as during ongoing operation of the compressor system. In this respect, reference is made to the illustration in FIG. 9 which clarifies better the problem of the optimization of the required pressure to the actually necessary pressure.

A significant predefinition to a control/monitoring unit of the compressor system is the pressure (required pressure), which is the minimum pressure which must be present at the transfer point to the customer's network. The control/monitoring unit 22 attempts to actuate the compressors 11, 12, 13 in such a way that the required pressure $p_{req}$ is always complied with and at the same time the electrical energy which is necessary to generate compressed air is minimized. As a result of a discontinuous rise in the compressed air consumption, the control/monitoring unit may output a switch-on command to a compressor 11, 12, 13 too late, and the required pressure is therefore undershot. Therefore, the required pressure $p_{req}$ is basically set somewhat higher in the control/monitoring unit than the pressure which the customer actually requires $p_{necessary}$. The distance between the set required pressure $p_{req}$ and the actually necessary pressure $p_{necessary}$ is a safety margin. However, as a result of the relatively high required pressure $p_{req}$, the energy requirement for the generation of compressed air increases, since the electrical power drain of the compressors 11, 12, 13 rises with the required pressure $p_{req}$. It is therefore desirable to set the required pressure as low as possible, but also at such a high level that in the case of jumps in consumption the actually necessary pressure is not undershot (cf. FIG. 9).

However, for the optimization of the required pressure $p_{req}$ it not sufficient simply to analyze only the time profile of the pressure p(t) which has been recorded in the past, since the change in the required pressure preq affects the behavior of the control of the compressor system. This results in other switching actions which result in a different profile of the pressure p(t).

By applying a simulation model of the compressor system derived from the P&I diagram of the compressor system, pressure profiles p(t) recorded in the past may be used to determine the minimum required pressure at which the actually necessary pressure is just no longer undershot. With such a simulation model (more detailed explanations on this may be found, for example, in International Application Publication No. WO 2010/072803 A1), it is also possible to determine how much energy may be saved by optimizing the required pressure $p_{req}$.

It is also possible to use models for monitoring compressor systems. By comparing the behavior of the real process with the model of the real process it is possible to detect if a behavior occurs in the real process which has not been expected in such a form (at least taking into account the model). If the reality and the model diverge from one another, a warning or a fault is triggered, for example, an alarm signal is triggered or a notification e-mail is sent to a person responsible for the system.

In the field of diagnostics, the cause of an incorrect behavior may be narrowed down or determined using models. In this context, for example various fault scenarios are simulated on the model and compared with the data observed in the real process when the fault occurs. The scenario which corresponds best to the reality gives an indication of the cause of the fault.

By using simulations in advance, it is possible to estimate the next deadline for maintenance of the compressor system or the compressors or the peripheral devices. By assuming a compressed air profile (for example observed in the past in the compressor system in question) it is determined how the individual compressors and peripheral devices of a compressor system are expected to be operated or loaded in the coming weeks or months. From the profile of the operating states of the compressors and the peripheral devices and a model for the wear of the maintenance-relevant components/operating resources it is possible to determine the date at which the wear limit (service life) of the component/operating resource will be reached.

Figure 10:
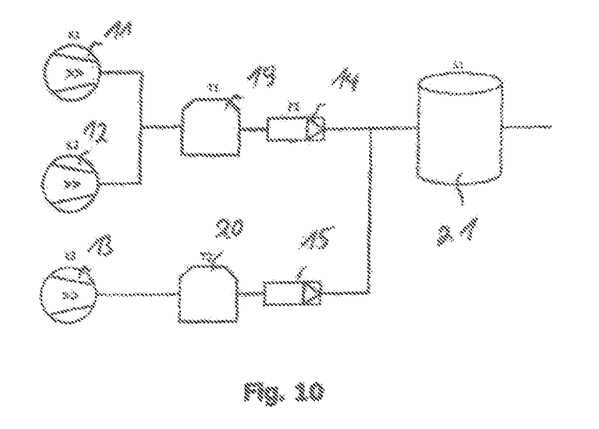
FIG. 10 shows an example illustrating how the effective buffer volume of a compressor system may be determined by applying a quantitative model of a compressor system.
Figure 11:
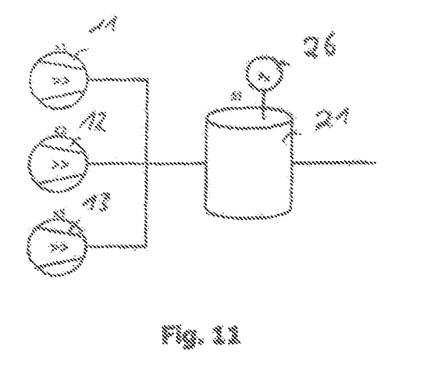
FIG. 11 shows an aspect-specific output model AAM which is derived from the design according to FIG. 10.
Figure 12:
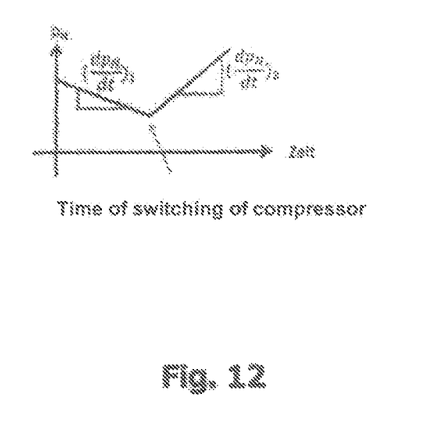
FIG. 12 shows the change in the pressure radiant at the time of the switching of a compressor.

A further example is given below as to how the effective buffer volume of a compressor system may be determined by applying a quantitative model of a compressor system. This is clarified on the basis of the compressor system as illustrated in FIG. 10. The compressor system is composed of the three compressors 11, 12, 13, the two driers 19, 20, the two filters 14, 15 and the compressed air accumulator 21. The function of the control/monitoring unit 22 is to determine what effective buffer volume the compressed air accumulator 21 (volume possibly known) has together with the pipeline network (volume usually unknown). The information about the effective buffer volume is used, for example, to calculate the current compressed air consumption, from which in turn the times for the switching actions of compressors are derived. To determine the effective buffer volume, the compressor system from FIG. 10 is firstly modeled in a model which contains only the components which are relevant for the determination of the buffer volume. A model AAM which is simplified with respect to the buffer volume, and illustrated in FIG. 11, is obtained. The driers 19, 20 and filters 14, 15 do not have any relevance for the calculation of the effective buffer volume and are therefore not taken into account in the aspect-specific output model AAM. The compressors 11, 12, 13 are, on the other hand, relevant since the switching actions at compressors are used to determine the effective buffer volume by the change in the gradient of the pressure sensor 26 which is mounted on the compressed air accumulator 21. The calculation of the buffer volume is carried out by comparing the pressure gradient before the switching action with the pressure gradient after the switching action. The switching action of a compressor brings about a situation, given a constant compressed air consumption, in which the pressure gradient changes, as illustrated with reference to FIG. 12. A number of assumptions are used as the basis for the calculation:

The "real" effective buffer volume does not change around the time of the switching action.

The compressed air consumption is constant around the time of the switching action.

The temperature of the compressed air in the pipeline system and in the buffer system is constant.

Assuming that the delivery quantity of the switching compressor is known, for example, because the delivery quantity is stored in a database which is accessible to the control and monitoring unit 22, the effective buffer volume $V_{eff}$ may be calculated from the change in the pressure gradient and the change in the delivery quantity of the compressors ☐FAD (corresponds to delivery quantity of the individual compressor) and the ambient pressure $p_{amb}$:

$$V_{eff} = \frac{\Delta FAD}{\left(\frac{dp_N}{dt}\right)_2 - \left(\frac{dp_N}{dt}\right)_1} * p_{amb}$$

Specifically the assumption that the compressed air consumption is constant around the time of the switching action is, in practice, not maintained during each switching action. It is therefore possible, and advantageous, to offset the individual estimation of the effective buffer volume against preceding estimations using filtering (for example information of mean values). For example, the mean value of the last 20 estimations is then used for the further processing. On the very realistic assumption that the change in consumption during the switching process has the same probability of occurring in the upward direction as in the downward direction, the changes in consumption during the filtering will on average cancel one another out.

The analysis according to the aspect margin will serve as an example for the analysis of the behavior of the compressor system: a measuring of the reliability of a compressor system is the margin. The margin is decisively determined by whether the compressed air consumption for the time interval under consideration exceeded or would have exceeded the available delivery quantity (taking into account the compressed air stored in the compressed air accumulator) if a compressor had failed. For this analysis routine, recourse is appropriately made to the configuration of the compressor system which is input as a P&I diagram, and to model thus derived therefrom. The calculation of the margin may be regarded either as analysis or as monitoring. If the analysis of the margin is used for monitoring, the operator of the compressor system may react and switch off compressed air consumers before the minimum necessary pressure is undershot or may equip the compressor system with further compressors. The degree of overloading could be defined at the failure of a compressor:

The worst degree of overloading: Has pressure undershooting occurred in the period of time considered even though all the compressors were available for the generation of compressed air?

A severe degree of overloading: Would pressure undershooting have occurred if the smallest compressor had failed?

Medium degree of overloading: Would pressure undershooting have occurred if a medium-sized compressor had failed?

Slight degree of overloading: Would pressure undershooting have occurred if a large compressor had failed?

The analysis as to whether, for example, a severe degree of overloading occurred in the period of time considered occurs by virtue of the fact that a simulation of the compressed air station occurs on the basis of the derived models with the predefinition that the smallest compressor must not be used for the compressed air supply. The simulation itself may be carried out as described, for example, in International Application Publication No. WO 2010/072803 A1.

As a result of the application of derived models relating to the behavior of the components of a compressor system, a prediction may be produced for the next maintenance deadline for the compressor system, for individual compressors or for individual peripheral devices. Derived models for simulation in advance may be used for this. With a derived model for simulation in advance, it is possible to predict for a given compressed air consumption profile how the individual compressors or peripheral devices of the compressor system will behave over time, for the execution of a simulation in advance within the scope of the model accuracy taking into account the control algorithm in the control/monitoring device which calculates the switching commands to the compressors such as would be produced in the genuine compressor system for the given compressed air consumption profile. The running behavior of the compressors may be derived from the switching commands to the compressors. The running behavior of the compressors describes in which operating state a compressor will be located at what time.

Insofar as there is a model for the maintenance-relevant components or operating resources which allows the state of wear of the maintenance-relevant component/operating resource to be inferred from the profile of the operating state of the compressor system, it is possible to determine on the basis of the results of the simulation in advance the time at which a state of wear which makes a maintenance measure necessary will be reached. For compressors today, the state of wear of a maintenance-relevant component/operation resource is determined on the basis of the operating hours of a compressor. For example, it is necessary to change the oil every 3000 operating hours. In future, it will be possible to define the state of wear of a maintenance-relevant component/operating resource no longer only according to the operating hours, but also according to the ambient conditions/operating conditions of the compressor system. If the models for simulation in advance model with sufficient accuracy effects which are relevant for the determination of the state of wear (for example compression temperature, pressure in the oil separator container, particle load of the sucked-in air, ambient temperature), predictions may also be produced for maintenance measures if the state of wear of the respective component/operating resource cannot be determined solely by the operating hours.

The accuracy of the prediction of the deadline for the next maintenance measure depends, of course, on to what extent the profile of the compressed air consumption which is assumed in the simulation in advance also occurs in reality.

An advantage of the prediction of the next maintenance deadline on the basis of simulations in advance compared to the trivial method of extrapolation of the operating hours is that a prediction is possible even if the composition of the compressed air station changes (for example adding or removing a compressor) or reparameterization of the compressed air control is performed (for example changing of the switch-on and switch-off sequence of compressors).

The prediction for the execution of the next maintenance measure is repeated regularly (for example once a day), wherein the profile, observed in the current compressor system since the execution of the last prediction, of the compressor states for the execution of a new prediction is also used. As a result, over time, the prediction of the next maintenance deadline becomes ever more precise since the portion of the wear which is observed under real conditions is used in the prediction and therefore the portion of the wear which still occurs up to the next maintenance (as uncertainty in the model) becomes ever smaller.

The method according to the present invention is, as a result, defined by the fact that individual method steps have to be carried out from the acquisition of the operating data up to the evaluation of the operating data for the purpose of:
  performing open-loop and/or closed-loop control;
  monitoring;
  diagnostics;
  optimization; and/or
  prediction of a maintenance deadline (predictive maintenance).

The individual method steps may be defined as follows.
The operational relationships in the compressor system to be analyzed must be defined, if appropriate input.
Operating data of the compressor system must be standardized in a suitable form.
Based on the operational relationships of the compressor system, one or more output models and models derived therefrom are produced.
Aspect-specific models of the compressor system are used to answer concrete questions.

The described four method steps are decoupled from one another both spatially and chronologically. There is merely one temporal link (pre-linking/post-linking) between the method steps; i.e., some method steps must be executed before other method steps and the results thereof must be made available before other method steps, which use the results from preceding method steps, may run. However, the method steps may be distributed between different systems (but do not have to be). However, if the method steps run on different systems, there must be a possibility of an exchange of information (at least unidirectionally).

Although the present invention has been described with reference to a compressor system, that is to say for overpressure, all of the principles may also be transferred to a vacuum system in which pumps interact instead of compressors.

Furthermore, generally compressors have been mentioned here without defining the particular type of the compressors. In one embodiment, all the compressors may be configured, for example, as displacement-type compressors, but this is not to be considered as a preferred embodiment and is not generally compulsory.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for controlling and/or monitoring a compressor system comprising one or more compressors and one or more peripheral devices, the compressors and peripheral devices being arranged or connected in a predetermined configuration, the compressor system being controlled and/or monitored by a control/monitoring unit, the method comprising:
  storing said predetermined configuration as a representation of a P&I diagram for automatic establishment of a monitoring logic stored in a memory operatively connected to said control/monitoring unit and subsequently controlling, monitoring, diagnosing or evaluating said compressor system according to said stored representation of a P&I diagram.

2. The method according to claim 1, wherein said stored representation of a P&I diagram comprises operational relationships between the one or more compressors and the one or more peripheral devices.

3. The method according to claim 2, wherein said stored representation of a P&I diagram comprises domain and/or viewpoint specific representations of the operational relationships between the one or more compressors and the one or more peripheral devices.

4. The method according to claim 2, wherein said stored representation of a P&I diagram comprises operational relationships between the one or more compressors and the one or more peripheral devices, and wherein the operational relationships are automatically derived from the P&I diagram.

5. The method according to claim 1, wherein said stored representation of a P&I diagram is automatically derived.

6. The method of claim 1, wherein one or more output models based on said stored representation of a P&I diagram are produced, and wherein on the basis of the output models, one or more derived models are produced which take into account operational relationships between individual compressors and the peripheral devices.

7. The method of claim 6, wherein said establishment of a monitoring logic is based at least on said derived models which take into account operational relationships between individual compressors and the peripheral devices.

8. The method according to claim 6, wherein the one or more derived models is an aspect-specific model which is produced using an aspect-specific analysis algorithm from the one or more output models or from one or more intermediate models.

9. The method of claim 1, wherein some or all of the compressors and/or peripheral devices sign on automatically at the control/monitoring unit by reference to specifications in the stored representation of a P&I diagram, and wherein the stored representation of a P&I diagram comprises the specifications of some or all of the compressors and/or peripheral devices prior to sign on.

10. The method according to claim 9, wherein the specifications of some or all of the compressors and/or peripheral devices are transferred to the control/monitoring unit upon sign on at the control/monitoring unit.

11. The method according to claim 1, wherein the method further comprises a step of inputting said predetermined configuration in the form of a P&I diagram through an input interface operatively connected to said control/monitoring unit.

12. The method according to claim 11, wherein the inputting of the P&I diagram comprises, in addition to the inputting of the arrangement or connection of the compressors and peripheral devices, concrete specifications of the compressors and peripheral devices which are present.

13. The method according to claim 11, wherein, when the P&I diagram is input by the input interface, the compressors and the peripheral devices are predefined or may be selected as corresponding graphic symbols.

14. The method according to claim 11, wherein, when the P&I diagram is input by the input interface, the connections of the compressors and of the peripheral devices are predefined or may be preselected as corresponding graphic symbols.

15. The method according to claim 11, wherein the method produces a prediction for a next maintenance deadline of the compressor system or of individual compressors or individual peripheral devices,
wherein the inputting of the P&I diagram forms the basis for one or more output models,
wherein, on the basis of the output models, one or more derived models are produced which take into account operational relationships between the individual compressors and the peripheral devices, and
wherein a prediction for the next maintenance deadline is produced taking into account standardized operational data of the compressor system using the derived models.

16. The method according to claim 1, wherein said stored representation of a P&I diagram is based on a plurality of domain-specific P&I diagrams.

17. A compressor system comprising:
one or more compressors;
one or more peripheral devices; and
a control/monitoring unit,
wherein the compressors and the peripheral devices are arranged or connected in a predetermined configuration,
wherein the compressor system is controlled and/or monitored by the control/monitoring unit,
wherein the compressor system is configured to store said predetermined configuration as a representation of a P&I diagram for automatic establishment of a monitoring logic stored in a memory operatively connected to said control/monitoring unit for use as a basis for subsequent control, monitoring, diagnostic or evaluation routines.

18. The compressor system according to claim 17, wherein the control/monitoring unit is implemented entirely or partially in one or more servers which are operatively connected to one another or in one or more virtual computers.

19. The compressor system according to claim 17, wherein the control/monitoring unit is embodied and configured such that, in the case of control, monitoring, diagnostic or evaluation routines, the control/monitoring unit accesses one or more derived models of the compressor system, the derived models being produced on the basis of one or more output models and taking into account operational relationships between the individual compressors and the peripheral devices.

20. A control/monitoring unit for controlling and/or monitoring a compressor system comprising one or more compressors and one or more peripheral devices, the compressors and peripheral devices being arranged or connected in a predetermined configuration, the control/monitoring unit arranged for controlling and/or monitoring of the compressor system,
wherein the control/monitoring unit is operatively connected to a memory for storing said predetermined configuration as a representation of a P&I diagram for automatic establishment of a monitoring logic,
wherein the control/monitoring unit is configured for controlling, monitoring, diagnosing or evaluating said compressor system according to said stored representation of a P&I diagram.

21. A control/monitoring unit according to claim 20 comprising an input interface for inputting the P&I diagram and/or a representation of the P&I diagram.

* * * * *